United States Patent
Shimizu et al.

(10) Patent No.: US 6,816,609 B1
(45) Date of Patent: Nov. 9, 2004

(54) VISION MEASURING MACHINE, METHOD, AND MEDIUM

(75) Inventors: Masato Shimizu, Kawasaki (JP); Koichi Komatsu, Kawasaki (JP)

(73) Assignee: Mitutoyo Corporation, Kawasaki (JP)

(*) Notice: Subject to any disclaimer, the term of this patent is extended or adjusted under 35 U.S.C. 154(b) by 572 days.

(21) Appl. No.: 09/590,899

(22) Filed: Jun. 9, 2000

(30) Foreign Application Priority Data

Jun. 15, 1999 (JP) ............................................. 11-168160
May 31, 2000 (JP) ........................................ 2000-161433

(51) Int. Cl.$^7$ .............................. G06K 9/00; H04N 7/18
(52) U.S. Cl. ........................ 382/151; 382/173; 382/291; 348/86; 702/35
(58) Field of Search ................................ 382/151, 152, 382/145, 286–291, 141, 147, 173; 348/86–92; 702/33–36

(56) References Cited

U.S. PATENT DOCUMENTS

| | | | | |
|---|---|---|---|---|
| 4,803,734 A | * | 2/1989 | Onishi et al. ................ | 382/115 |
| 4,876,728 A | | 10/1989 | Roth | |
| 5,134,575 A | * | 7/1992 | Takagi .......................... | 382/147 |
| 5,519,793 A | * | 5/1996 | Grannes ....................... | 382/266 |
| 5,542,600 A | * | 8/1996 | Kobayashi et al. .......... | 228/102 |
| 5,576,948 A | * | 11/1996 | Stern et al. .................... | 700/59 |
| 5,699,447 A | * | 12/1997 | Alumot et al. ............... | 382/145 |
| 6,333,992 B1 | * | 12/2001 | Yamamura et al. .......... | 382/149 |

FOREIGN PATENT DOCUMENTS

JP      5-302896      11/1993

OTHER PUBLICATIONS

Donahue et al., "Quality Technology for the Factory Floor," May 1989. Proceedings of the IEEE 1989 National Aerospace and Electronics Conference. vol. 4, pp. 1522–1528.*

* cited by examiner

Primary Examiner—Bhavesh M. Mehta
Assistant Examiner—Aaron Carter
(74) Attorney, Agent, or Firm—Oliff & Berridge, PLC

(57) ABSTRACT

In this machine and method for measuring a plurality of workpieces, images of a plurality of workpieces placed on a stage are captured using a CCD camera. The images are processed by a computer system whereby the workpieces are measured. A computer system divides a measurement area on the stage into matrix such that each cell in the matrix is correlated to each workpiece. Then, the system sets a measurement program for each cell. Using the cells, the computer system determines a measurement order and whether or not to execute measurement. Measurement data for each cell is output to a CRT.

47 Claims, 15 Drawing Sheets

FIG. 8

| POSITION | SETTING | RESULT |

| NUMBER OF ROWS | 7 | NUMBER OF COLUMNS | 7 | NUMBER OF EXECUTIONS | 1 |   } 105

| C:¥Program Files¥QVPMgr¥test¥990 | REFERENCE |
| C:¥Program Files¥QVPMgr¥test¥990 | REFERENCE |   } 106

START POSITION
- ⦿ KEY DESIGNATION
  - X 0   Y 0   Z 0
  - HORIZONTAL DISPLACEMENT AMOUNT 27.3   VARTICAL DISPLACEMENT AMOUNT 18.8
- ○ PCS FILE DESIGNATION
  - [ ] REFERENCE
  - ○ FOR ALL WORKS   ⦿ FOR EVERY WORKS

} 107

MEASUREMENT DATA FILE NAME
  SAVE ADDRESS C: Program Files¥QVPMgr¥test¥
  | R990601_01.txt | REFERENCE |
  ○ FOR ALL WORKS   ⦿ FOR EVERY WORKS

} 108

STATISTIC RESULT FILE NAME
  SAVE ADDRESS C: Program Files¥QVPMgr¥test¥
  | S990601_01.txt | REFERENCE |
  ○ FOR ALL WORKS   ⦿ FOR EVERY WORKS

} 109

MOVEMENT ORDER    ○ ROW  ○ COLUMN   } 110

| CONFIRM | CANCEL |

| | | | | | | | |
|---|---|---|---|---|---|---|---|
| | 43 | 44 | 45 | 46 | 47 | 48 | 49 |
| | 36 | 37 | 38 | 39 | 40 | 41 | 42 |
| | 29 | 30 | 31 | 32 | 33 | 34 | 35 |
| | 22 | 23 | 24 | 25 | 26 | 27 | 28 |
| | 15 | 16 | 17 | 18 | 19 | 20 | 21 |
| | 8 | 9 | 10 | 11 | 12 | 13 | 14 |
| | 1 | 2 | 3 | 4 | 5 | 6 | 7 |
| | A | B | C | D | E | F | G |

| 1 | 2 | 3 | 4 | 5 | 6 | 7 |
|---|---|---|---|---|---|---|

ENTIRE

COMPANY NAME : ABC K.K.
PART NUMBER : P-001
PART NAME : DEMO-WORK
LOT NUMBER : L-001
DRAWING NUMBER : Z-001
MACHINE ID : M-001
MANUFACTURING DATE : 1999/6/2

MEASUREMENT DATA SAVING FOLDER : C:¥Program Files¥QVPMgr¥test¥
MEASUREMENT COMPLETION : REMAINING----
TIME FOR ALL WORKS

PASSING RATE

|   |   |   |   |   |   |   |
|---|---|---|---|---|---|---|
|   |   |   | 43 | 44 | 45 | 46 | 47 | 48 | 49 |
|   |   |   | 36 | 37 | 38 | 39 | 40 | 41 | 42 |
|   | 7 |   | 29 | 30 | 31 | 32 | 33 | 34 | 35 |
|   | 6 |   |    |    |    |    |    |    |    |
|   | 5 |   | PASS | PASS | MEASURE | 25 | 26 | 27 | 28 |
|   | 4 |   | FAIL | PASS | FAIL | PASS | PASS | PASS | PASS |
|   | 3 |   | PASS | PASS | PASS | PASS | ERROR | PASS | ERROR |
|   | 2 |   | PASS | PASS | PASS | ERROR | PASS | PASS | FAIL |
|   | 1 |   |    |    |    |    |    |    |    |

COMPANY NAME : ABC K.K.
PART NUMBER : P-001
PART NAME : DEMO-WORK
LOT NUMBER : L-001
DRAWING NUMBER : Z-001
MACHINE ID : M-001
MANUFACTURING DATE : 1999/6/2

ENTIRE  | A | B | C | D | E | F | G

MEASUREMENT DATA STORING FOLDER : C:\Program Files\QVPMgr\test

| WORK 24 1ST EXECUTION/1ST TIME | PASSING RATE : 72.7% | MEASUREMENT COMPLETION : REMAINING 0.5 TIME FOR ALL WORKS |

— 124 (PASS)
— 126 (ERROR)
— 128 (FAIL)
— 130
— 132
— 134

FIG. 12

| | | | | | | | |
|---|---|---|---|---|---|---|---|
| | A | B | C | D | E | F | G |
| 1 | PASS | PASS | PASS | PASS | PASS | PASS | FAIL |
| 2 | PASS | PASS | PASS | ERROR | ERROR | PASS | ERROR |
| 3 | PASS | PASS | FAIL | PASS | PASS | PASS | PASS |
| 4 | FAIL | PASS | PASS | PASS | PASS | PASS | ERROR |
| 5 | PASS | FAIL | PASS | PASS | FAIL | PASS | PASS |
| 6 | PASS | PASS | PASS | PASS | PASS | PASS | PASS |
| 7 | PASS | PASS | PASS | PASS | PASS | PASS | PASS |

COMPANY NAME : ABC K.K.
PART NUMBER : P-001
PART NAME : DEMO-WORK
LOT NUMBER : L-001
DRAWING NUMBER : Z-001
MACHINE ID : M-001
MANUFACTURING DATE : 1999/6/2

ENTIRE

MEASUREMENT DATA STORING FOLDER : C:\Program Files\QVPMgr\test\

PASSING RATE : 81.3%

MEASUREMENT COMPLETION : REMAINING----
TIME FOR ALL WORKS

FIG. 13

| POSITION | SETTING | RESULT | | |
|---|---|---|---|---|

| NUMBER OF WORKS | NUMBER OF PASSED WORKS | NUMBER OF FAILED WORKS | NUMBER OF ERRORS |
|---|---|---|---|
| 49 ▽ | 39 ▽ | 4 ▽ | 5 ▽ |

⎫ 130

JUDGMENT RESULT     MEASUREMENT DATA FILE NAME

| | |
|---|---|
| [PASS] | R990601_010A01. txt |
| [PASS] | R990601_010B01. txt |
| [PASS] | R990601_010C01. txt |
| [ERROR] | R990601_010D01. txt |
| [PASS] | R990601_010E01. txt |
| [PASS] | R990601_010F01. txt |
| [ERROR] | R990601_010G01. txt |
| [PASS] | R990601_010A02. txt |
| [PASS] | R990601_010B02. txt |
| [PASS] | R990601_010C02. txt |
| [PASS] | R990601_010D02. txt |
| [ERROR] | R990601_010E02. txt |
| [PASS] | R990601_010F02. txt |
| [ERROR] | R990601_010G02. txt |
| [FAIL] | R990601_010A03. txt |
| [PASS] | R990601_010B03. txt |
| [FAIL] | R990601_010C03. txt |
| [PASS] | R990601_010D03. txt |
| [PASS] | R990601_010E03. txt |
| [PASS] | R990601_010F03. txt |
| [PASS] | R990601_010G03. txt |
| [PASS] | R990601_010A04. txt |
| [PASS] | R990601_010B04. txt |
| [PASS] | R990601_010C04. txt |

⎫ 132

| RELEASE SELECTION | DISPLAY RESULT |
|---|---|

| ELEMENT | | ACTUAL MEASUREMENT VALUE | DESIGN VALUE | ERROR (TP ERROR) | UPPER TOLERANCE (TP ERROR) | LOWER TOLERANCE | OK/NG |
|---|---|---|---|---|---|---|---|
| POINT : (ID : 3) | | | | | | | |
| COORDINATE | X= | 0.38696 | | | | | |
| COORDINATE | Y= | -0.17235 | | | | | |
| ELEMENT | | ACTUAL MEASUREMENT VALUE | DESIGN VALUE | ERROR (TP ERROR) | UPPER TOLERANCE (TP ERROR) | LOWER TOLERANCE | OK/NG |
| CIRCLE : (ID : 1) | | | | | | | |
| COORDINATE | X= | 5.69717 | 5.80000 | -0.10283 | 0.30000 | -0.30000 | OK |
| COORDINATE | Y= | 7.46681 | 7.90000 | -0.43319 | 0.30000 | -0.30000 | NG |
| DIAMETER | D= | 5.28433 | 5.20000 | 0.08433 | 0.30000 | -0.30000 | OK |
| POINT : (ID : 4) | | | | | | | |
| COORDINATE | X= | 12.56095 | 12.80000 | -0.23905 | 0.30000 | -0.30000 | OK |
| COORDINATE | Y= | 7.01328 | 7.20000 | -0.18672 | 0.30000 | -0.30000 | OK |

*FIG. 15*

VISION MEASURING MACHINE, METHOD, AND MEDIUM

BACKGROUND OF THE INVENTION

1. Field of the Invention

The present invention relates to a vision measuring machine, such as a microscopic measuring device or a non-contact view measuring CMM, and in particular to measurement using a program (a part program).

2. Description of the Related Art

Conventionally, manually operating vision measuring machines and CNC (Computerized Numerical Control) vision measuring machines are used for inspection of ICs, read frames, IC packages, and so on. Generally, in measurement using a vision measuring machine, an object to be measured (workpiece), such as an IC, is placed on a stage, and photographed by an imaging means, such as a camera, so that an image thereof is displayed on a CRT. Subsequently, a part program for workpiece measurement is activated. A part program is a program prepared by storing information on a series of measurement procedures for one sample, taught by an operator, as well as information on the position and shape of the workpiece. When a part program is activated, commands are sequentially read from a prepared part program file. In response to a stage moving command, a driving means moves the stage. In response to a tool command, images of tools, such as a box tool, a circular tool, and so on, are added to a workpiece image displayed on the CRT. In this procedure, an edge point is detected using the provided tool, and a continuous edge is approximated from detected points using a least square method or the like. In response to an operation execution command, a designated operation, such as a line width operation, a circle center operation, a circle radius operation, and so on, is executed with respect to the workpiece image, based on the continuous edge.

As described above, in a conventional vision measuring machine, for automatic measurement, a measurement program including a measurement route is prepared for every workpiece to be measured, and executed. For measurement of a plurality of workpieces of an identical shape, such a measurement program is first prepared by manually measuring one workpiece and recording the measurement procedure, known from the manual measurement, and thereafter, while placing the remaining workpieces on the stage one by one, coordinate matching measurement (measurement reference position adjustment) is applied to the workpiece then on the stage, followed by execution of the measurement program prepared.

Note that coordinate matching measurement, which can be made manually, is usually made by executing a workpiece coordinate system measuring program (a Part Coordinate System, or PCS, program) while placing the workpiece one at a time on a position on the stage marked with tape or the like.

This, however, is troublesome and time consuming as each workpiece must be placed on a stage for measurement, and measuring programs must be exchanged for every type of workpieces when workpieces of a plurality of different types are to be measured.

In order to address the above problem, a plurality of workpieces may be collectively placed on the stage, and measured using a single measurement program. However, a single measurement program as currently in use is an integration of a plurality of measurement programs, each dedicated to a specific type of workpiece, such a program is thus inevitably lengthy and difficult to be composed. In addition, should any error be caused while measuring a plurality of workpieces, the measurement program must be amended, which may take time. Once the amended measurement program is resumed, workpieces measured before the-error in the measuring program must be measured again. Such repeated measurement is wasteful. Further, as the results of measurements of a plurality of workpieces obtained by repeatedly executing a single part program are stored in a single file (a result file), the result file must be edited every subsequent application of statistical processing to the measurement data. This may complicate statistical processing.

Also, as measurement of a plurality of workpieces on a stage may generally take time, unmanned, automatic measurement at night or during a holiday is highly desired. That is, it is highly desirable that measurement of workpieces on a stage be continued until completed, even when an error occurs during the measurement. Also desired is prompt post-measurement detection as to which workpieces on the stage are within tolerance, and which do not. It may often be desired that workpieces failing tolerance can be easily remeasured. As these demands can not be met by conventional measuring devices, demand for a device or method for readily and efficiently measuring numerous workpieces remains unsatiated.

SUMMARY OF THE INVENTION

The present invention has been conceived to overcome the above problems and aims to provide a device, method, and medium for efficiently measuring numerous workpieces through simple operation.

In order to achieve the above objects, according to the present invention, there is provided a vision measuring machine, comprising a stage for bearing measurement objects placed thereon, an imaging device for capturing an image of the measurement objects placed on the stage, and a processing device for measuring measurement object images in an image captured by the imaging device, wherein the processing device divides the stage into a plurality of sections to form a plurality of measurement sections each having a measurement object image, sets a measurement program to each of the plurality of measurement sections, and measures each of the measurement object images in the plurality of measurement sections based on a corresponding measurement program.

Also, according to the present invention, there is provided vision measuring machine, comprising an imaging device for capturing images of a plurality of measurement objects on a pallet segmented into a plurality of sections, and a processing device for measuring measurement object images in an image captured by the imaging device, wherein the processing device divides a measurement area into a plurality of sections to form a plurality of measurement sections, sets a measurement program to each of the plurality of measurement sections, and measures each of the measurement object images in the plurality of measurement sections based on a corresponding measurement program.

Here, preferably, the processing device determines whether or not measurement data on each of the plurality of measurement sections is within a predetermined tolerance, and outputs a GO/NG judgement for each of the plurality of measurement sections.

Also, preferably, the processing device outputs measurement data on each of the plurality of measurement sections.

Further, preferably, the processing device measures all other measurement sections in the plurality of sections even though measurement disorder should be caused to any measurement section.

Still further, preferably, the processing device measures only the measurement section selected in the plurality of sections.

Still further, the plurality of sections each have a desired shape, and are arranged in matrix. Preferably, each measurement section is a closed cell.

Also preferably, the processing device captures images of a plurality of measurement sections at the same time, and executes, simultaneously or sequentially, each measurement program set to each measurement section.

In addition, preferably, the processing device may preset a measuring program for each shape to be executed for every shape element. The processing device recognizes a shape element of a measurement object image in a measurement section, and selectively executes a suitable measurement program according to the results of recognition processing.

Further, preferably, the measurement program may be a program in which a numeric part thereof may be replaced by a variable as necessary.

The processing device may correct a measurement error.

The vision measuring machine of the present invention may further comprise positioning means for positioning a palette relative to the machine.

The vision measuring machine may also comprise an automatic workpiece exchanger for automatically exchanging measurement objects.

The vision measuring machine may further comprises an automatic palette exchanger for automatically exchanging palettes.

Yet further, according to the present invention, there is provided a vision measuring method for processing an image obtained by photographing a plurality of measurement objects placed on a stage, to thereby measure the measurement objects. This method comprises the steps of correlating each of a plurality of measurement sections in a plurality of sections to each of the plurality of measurement object images; setting a measurement program to each of the plurality of measurement sections; and measuring in each of the plurality of measurement sections according to a corresponding measurement program.

Yet further, according to the present invention, there is provided a vision measuring method for processing a captured image of a plurality of measurement objects in a palette segmented into a plurality of sectors, to thereby measure the measurement objects. This method comprises the steps of dividing a measurement area bearing a plurality of measurement objects into a plurality of sections to form a plurality of measurement sections each correlating to one of a plurality of measurement object images, setting a measurement program to each of the plurality of measurement sections; and measuring in each of the plurality of measurement sections according to a corresponding measurement program.

Here, the above method further comprises the step of displaying data indicating whether or not a result of measurement of each of the plurality of measurement sections is within a predetermined tolerance.

Also, the above method may further comprise the step of displaying a result of measurement of each of the plurality of measurement sections.

Further, in the above method, at the step of measurement, even though measurement disorder should be caused to one measurement section, all other measurement sections may be measured.

Still further, the above method may further comprise a step of selecting a measurement section in a plurality of sections so as to measure only the selected measurement section at the measurement step.

Also, the plurality of sections each preferably have a desired shape, and are arranged in matrix. Preferably, the measurement section is a closed cell.

At the measurement step, preferably, images of the plurality of measurement sections are captured simultaneously, and measurement programs each set to each measurement section may be executed simultaneously or sequentially.

The setting step includes a step of setting a measurement program to be executed for every shape element.

The measurement section further comprises a step of recognizing a shape element of a measurement object image in a measurement section, and a step of selectively executing the measurement program based on a result of the recognition.

Preferably, the measurement program is a program in which a numeric part thereof may be replaced by a variable as necessary.

Further preferably, the step of measurement may comprise an error correction step for correcting a measurement error.

Still further, preferably, the step of measurement may comprise a step of exchanging measurement objects, and a step of exchanging palettes.

As described above, in the present invention, a plurality of workpieces are handled collectively in units of a plurality of sections. This is different from the conventional art, in which a plurality of workpieces are individually measured. Each of the plurality of workpieces corresponds to each measurement section in the plurality of sections, and selection of a measurement section enables designation of a corresponding workpiece. Moreover, measuring programs can be easily set to a plurality of workpieces for measurement by setting a measuring program to each measurement section in a plurality of sections.

The technical concept that a measurement program is set to each measurement section in a plurality of sections can be applied to a variety of situations. For example, cases wherein a plurality of sections are arranged in matrix or wherein workpieces of an identical type are present in a row can be handled by setting identical measuring programs collectively to a row. A case wherein only some of a plurality of workpieces are to be selectively measured can be handled by selectively setting measurement programs to corresponding measurement sections in the plurality of sections.

In addition, even should measurement error or disruption be caused to one of a plurality of workpieces being successively measured, according to the present invention, measurement can continue with other measurement sections to finish measurement for all other measurement sections in the plurality of sections. This differs from the conventional art, in which measurement is discontinued when disrupted because a single measurement program is used for all workpieces on a stage. The present makes this, possible because a measuring program is set individually to each measurement section, such as a cell.

"A measurement program" contains a PCS part program, as well as a measurement part program, and so on. A PCS part program is a program for matching, prior to measurement, the coordinate system of a vision measuring machine to a reference position of each workpiece. A measurement part program is a program for detecting an edge of a workpiece image by using a measuring tool, and for executing a predetermined operation (a line width operation, a circle center operation, and so on), based on the detected edge.

Basically, the position or size of each of a plurality of sections is desirably determined. It is therefore possible to designate one or more island-shaped sections indicative of a part or parts for measurement in a workpiece and a remaining workpiece part, though respective sections arranged orderly in matrix could facilitate positional designation of a plurality of sections.

For measurement, one of a plurality of sections may be imaged and the associated program may be executed. Alternatively, images of some sections in a plurality of sections may be captured and the associated programs may be simultaneously or sequentially executed. This latter method can reduce measurement time, and is particularly effective in reducing a measurement time when each measurement section is small and arranged side-by-side.

Further, a measurement program may be determined in advance for each shape element (a circle, a rectangular, a straight line, and so on). In actual workpiece measurement, a shape element of each measurement object image is recognized based on the imaging of each section, and a measurement program to be applied is selected based on the result of recognition. This can improve efficiency in measurement program preparation. In this case, an example effective measurement program would be a parametric program disclosed in JP Laid-open No. Hei 8-14876, in which a numeric part thereof is replaced by a variable upon necessity. In actual measurement, a shape parameter (a diameter, center coordinates of a circle, and so on) value, obtained based on the result of recognition of the measurement object image is substituted into the variable before executing the measurement program.

With this arrangement, in an example of circle measurement, a measurement program free from dependency on the size or position of a circle can be prepared. This enables sharing of a measurement program, and therefore significant reduction of a program preparation time.

In addition, when various error corrections, such as corrections on expansion/contraction with a workpiece or measurement device due to temperature, on measuring displacement accuracy, on volumetric measuring accuracy, and so on, can be applied to improve measuring accuracy. The present invention can be applied to a case where a palette segmented into a plurality of sections is placed on a stage, as well as a case where one workpiece having a plurality of parts for measurement or a plurality of workpieces are regularly arranged on the stage. A palette is positioned by a positioning means provided on the stage, whereby the position of the palette relative to the device can be readily defined, and measurement can be facilitated.

The present invention may also comprise an automatic workpiece exchanger for automatically exchanging workpieces. This enables unmanned successive operations, even at night, and thereby further reduces costs. In addition, an automatic palette exchanger may also be provided, which can produce identical advantage to that by an automatic workpiece exchanger.

Further, according to the present invention, there is provided a computer readable medium storing an image processing program. The program causes a computer to correlate each of a plurality of measurement sections in a plurality of sections to each of a plurality of measurement objects, set a measurement condition to each of the plurality of measurement sections, and measure for each of the plurality of measurement sections according to the measurement condition.

BRIEF DESCRIPTION OF THE DRAWINGS

The above and other objects, features, and advantages of the present invention will become further apparent from the following description of the preferred embodiment taken in conjunction with the accompanying drawings wherein:

FIG. 8 shows an example reference coordinate system setting image screen in the embodiment;

FIG. 9 shows an example parameter setting screen in the embodiment;

FIG. 10 shows an example matrix image screen in the embodiment;

FIG. 12 shows an example image screen for measurement in the embodiment;

FIG. 13 shows an example display at completion of measurement in the embodiment;

FIG. 14 shows an example display listing measurement data files display screen in the embodiment; and FIG. 15 shows an example display of a measurement data file in the embodiment.

DESCRIPTION OF THE PREFERRED EMBODIMENT

In the following, a preferred embodiment of the present invention will be described with reference to the accompanying drawings.

Figure 1:
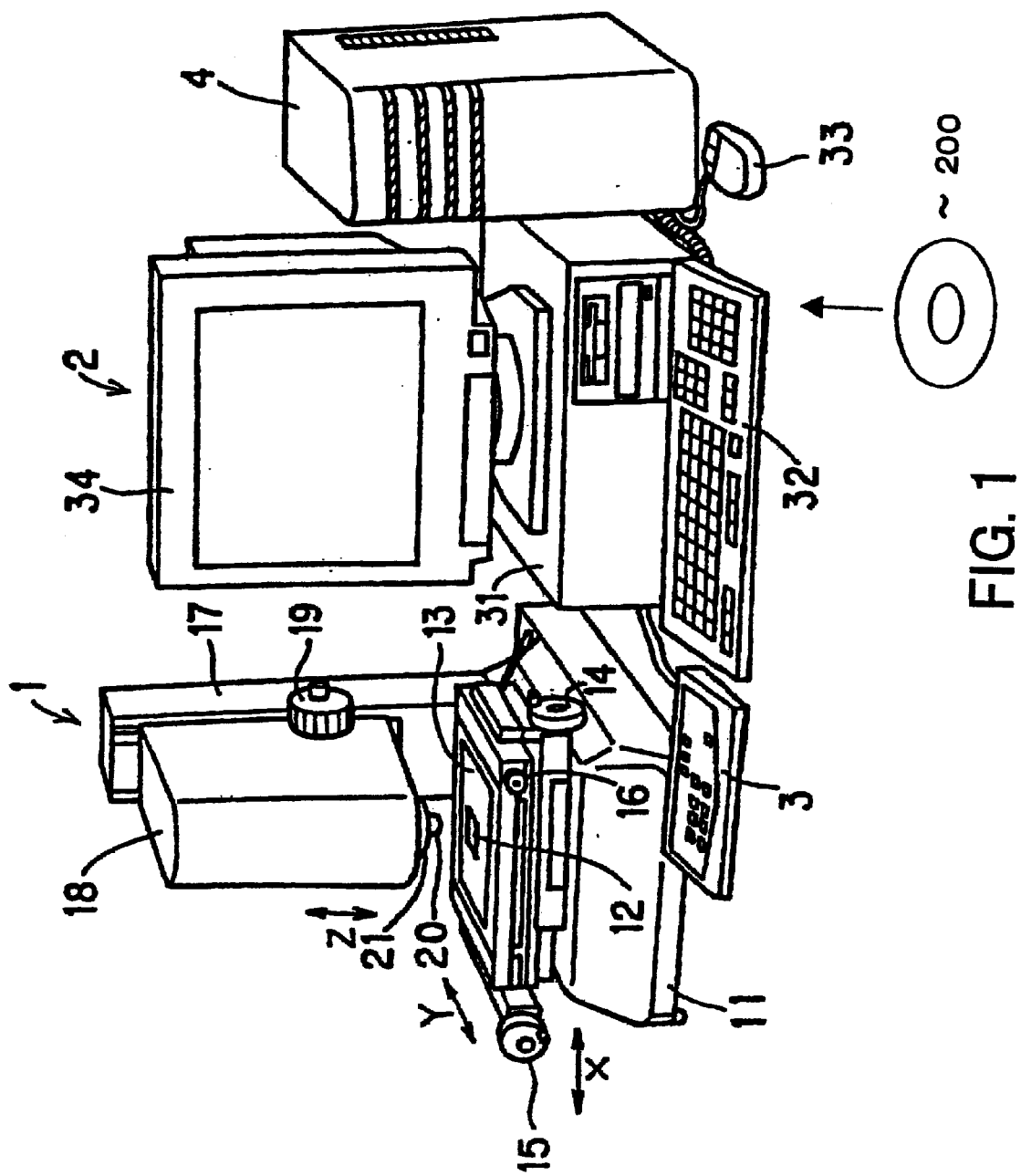
FIG. 1 is a perspective view showing a preferred embodiment of the present invention.

FIG. 1 is a perspective view showing a complete structure of a vision measuring machine in the preferred embodiment. The vision measuring machine in this embodiment comprises a measuring device body 1 of non-contact image measuring type, a computer system 2 for assisting to move the stage of the measuring device body 1 and for executing required data measurement, a command input section 3 for supplying a necessary measurement command or parameter to the measuring device body 1, a keyboard, 32, a mouse 33, and a power unit 4 for supplying stable power to the respective sections of the device.

The vision measuring machine 1 has a stage on a console table 11, on which a measurement object 12, such as a read frame, an IC, or the like, is placed. The stage 13 is driven to be moved in the X-axis and Y-axis directions by respective X-axis driving shaft 14 and Y-axis driving shaft 15. The console table has a frame 17 fixedly attached on the back side thereof. The frame 17, which extends upward, supports a CCD camera unit 18. The CCD camera unit 18 is movable in the Z-axis direction along a guide rail formed on the frame 17 by means of a Z-axis driving shaft 19. The CCD camera unit 18 incorporates a CCD camera 20 to image the stage from above. The CCD camera 20 has, on the lower end thereof, a ring-shaped illumination unit 21 for illuminating a workpiece 12. An image of a workpiece 12 (a workpiece image) captured using the CCD camera unit 18 is displayed on the CRT 34 of the computer system 2.

Figure 2:
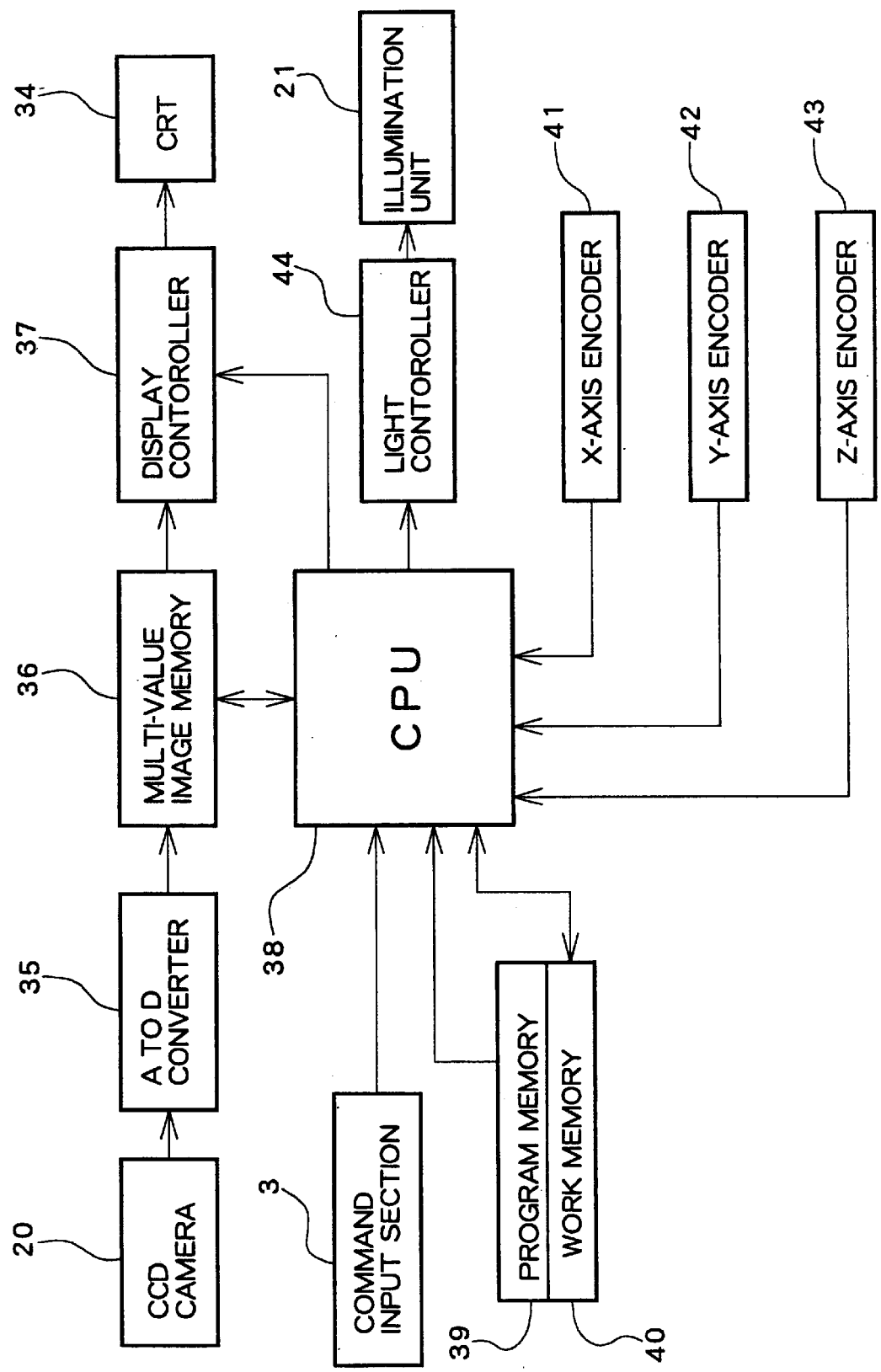
FIG. 2 is a block diagram showing a structure of the embodiment.

FIG. 2 is a block diagram showing a structure of the vision measuring machine in this embodiment. An image signal of a workpiece 12 captured by the CCD camera 20 is converted into digital image data in an A to D converter 35 and stored in a multi-value image memory 36. Digital image data in the multi-value image memory 36 is displayed on the CRT 34 through operation of a display controller 37. The CPU 38 performs measurement according to a part program stored in the program memory 39. A workpiece memory 40 offers a workpiece area for the CPU 38 to perform processing.

In addition, X-axis, Y-axis, and Z-axis encoders 41, 42, 43 are provided to detect the position of the CCD camera 20 relative to the stage 13 in the X-axis, Y-axis, and Z-axis directions, respectively, and supply outputs to the CPU 38. A light controller 44 generates an analog command voltage based on a command value generated in the CPU 38, and supplies the command voltage to the illumination unit 21.

In the following, referring to the flowchart in FIGS. 3 to 5, generation and execution of a part program by the CPU 38 with a plurality of workpieces 12 on a stage, in particular, with a plurality of workpieces 12 on a matrix-segmented palette on a stage, will be described in detail.

An application for measuring a plurality of workpieces 12 (hereinafter referred to as a matrix program) will serve as a client application for a main image measuring program executed in the CPU 38. An image measuring program and a matrix program are both stored in a program memory 39. In response to an Application Interface (API) issued from the image measuring program when activated, the matrix program is activated. The activation may be effected by selecting from a pull-down menu, or with arrangement such that activation of the image measuring program triggers activation of the matrix program. When a measurement parameter is designated in the matrix program, part programs are prepared for a plurality of workpieces 12.

Figure 7:
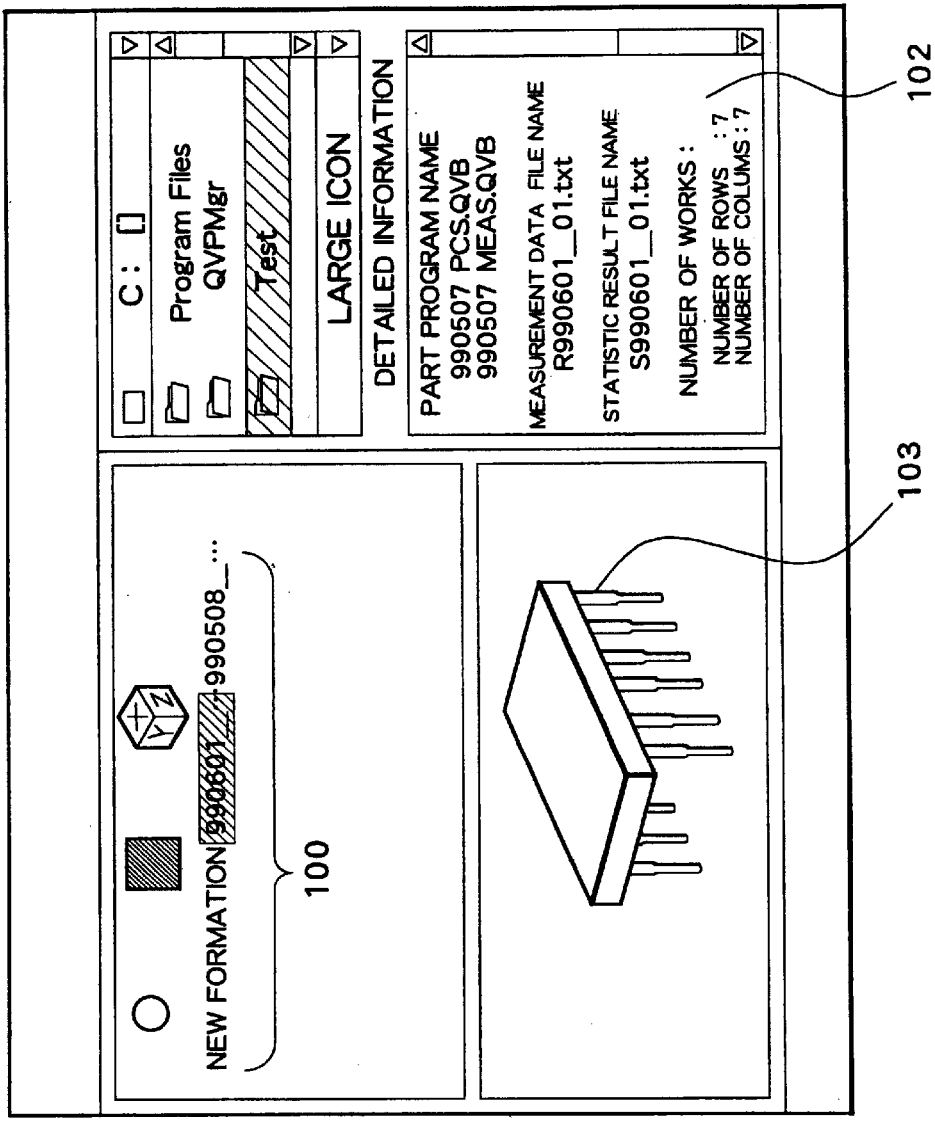
FIG. 7 shows an example initial image screen in the embodiment.

FIG. 7 shows an image screen of the CRT 34 which is displayed in response to activation of a matrix program from an image measuring program. In the drawing, a part program which has been prepared is represented by icon 100. Details of a part program represented by an icon selected are shown in the window 102. The details including a part program name, measurement data file name, a statistic result file name, and the number of workpieces. "Measurement data file name" is a name of a file which stores measurement data obtained by executing a part program. Note that, as measurement data of each workpiece is stored in an individual file in this embodiment (as described later), the file designated above will serve as a parent file of sub-files prepared for each workpiece. Each workpiece measurement data sub-file can be manually set by an operator, or, alternatively, can be sequentially prepared automatically by the CPU 38 according to a matrix program. "A statistic result file name" is a name of a file which stores a result of statistic processing using measurement data. "The number of workpieces" is the number of workpieces placed on a stage, which is defined by the rows and columns of the matrix. In the drawing, forty nine workpieces (7 rows×7 columns) are placed on the stage. The type of workpieces to be measured using a part program which is represented by an icon selected, is schematically shown in the window 103. In the drawing, a program for measuring a plurality of ICs is selected as a part program.

With this image screen on, a part program for measuring a plurality of workpieces 12 can be newly prepared by selecting the "new" icon among the icons 100. Thereupon, the CPU 38 switches the image screen to that which is shown in FIG. 8 according to the matrix program.

Figure 3:
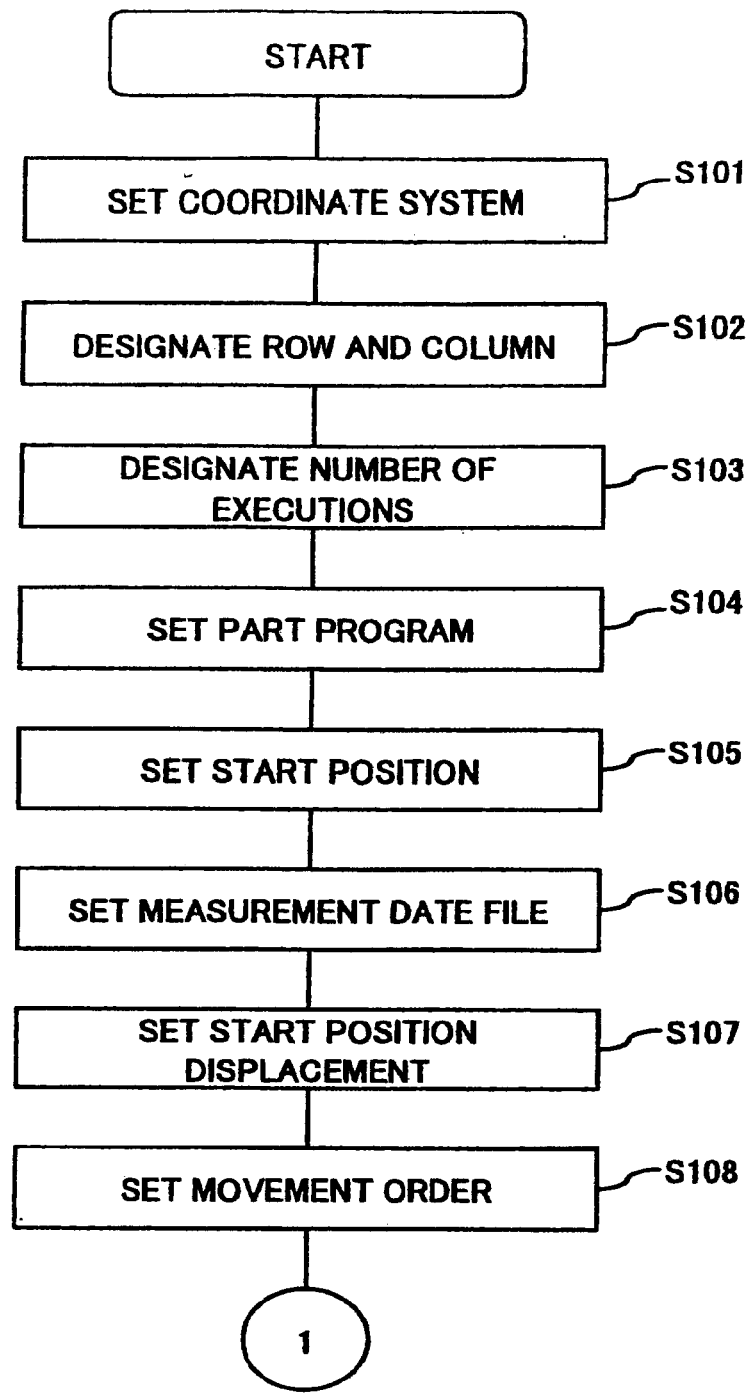
FIGS. 3, 4, and 5 are sections of a flowchart which together illustrate the entire processing in the embodiment.
Figure 4:
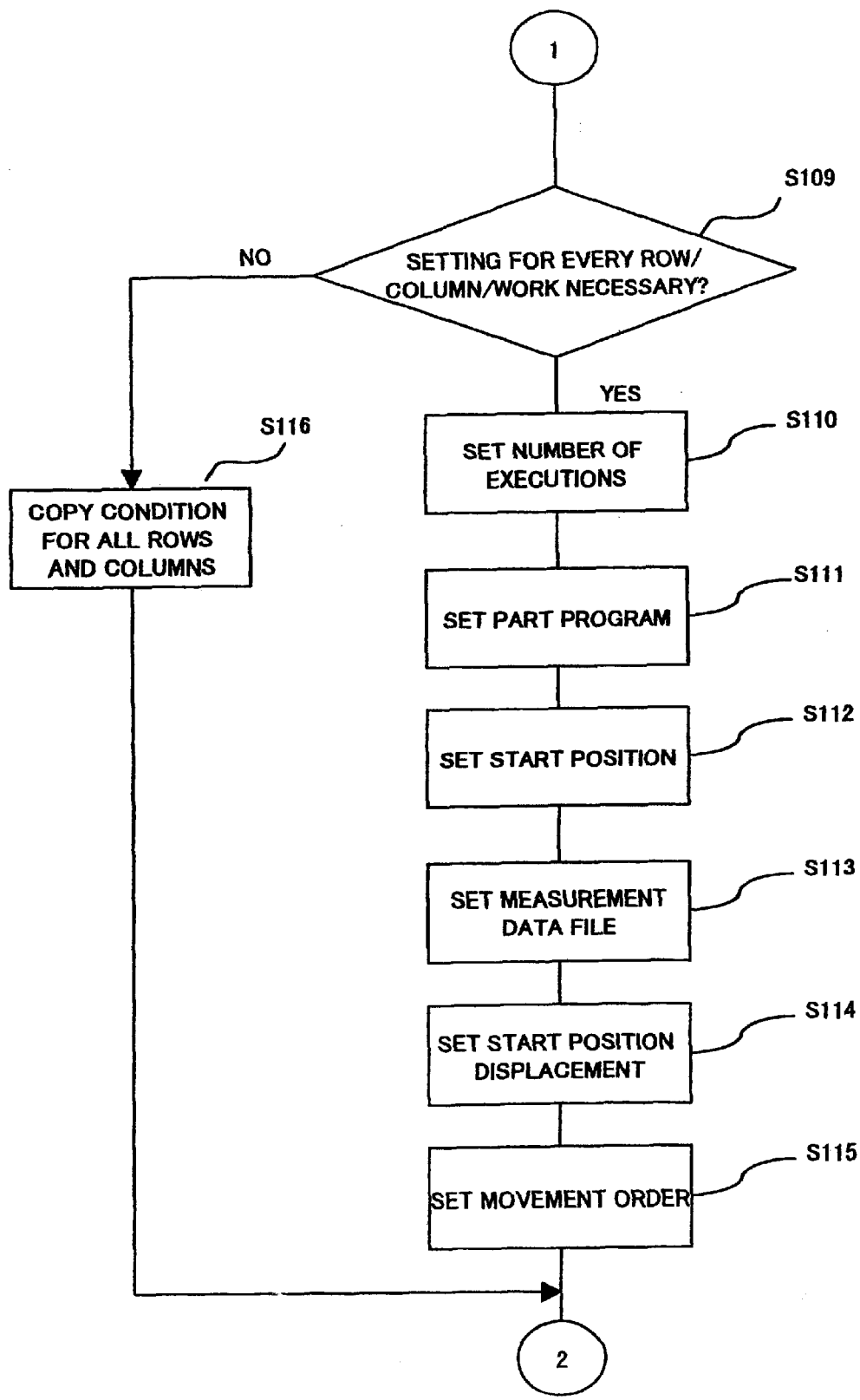
Figure 8:
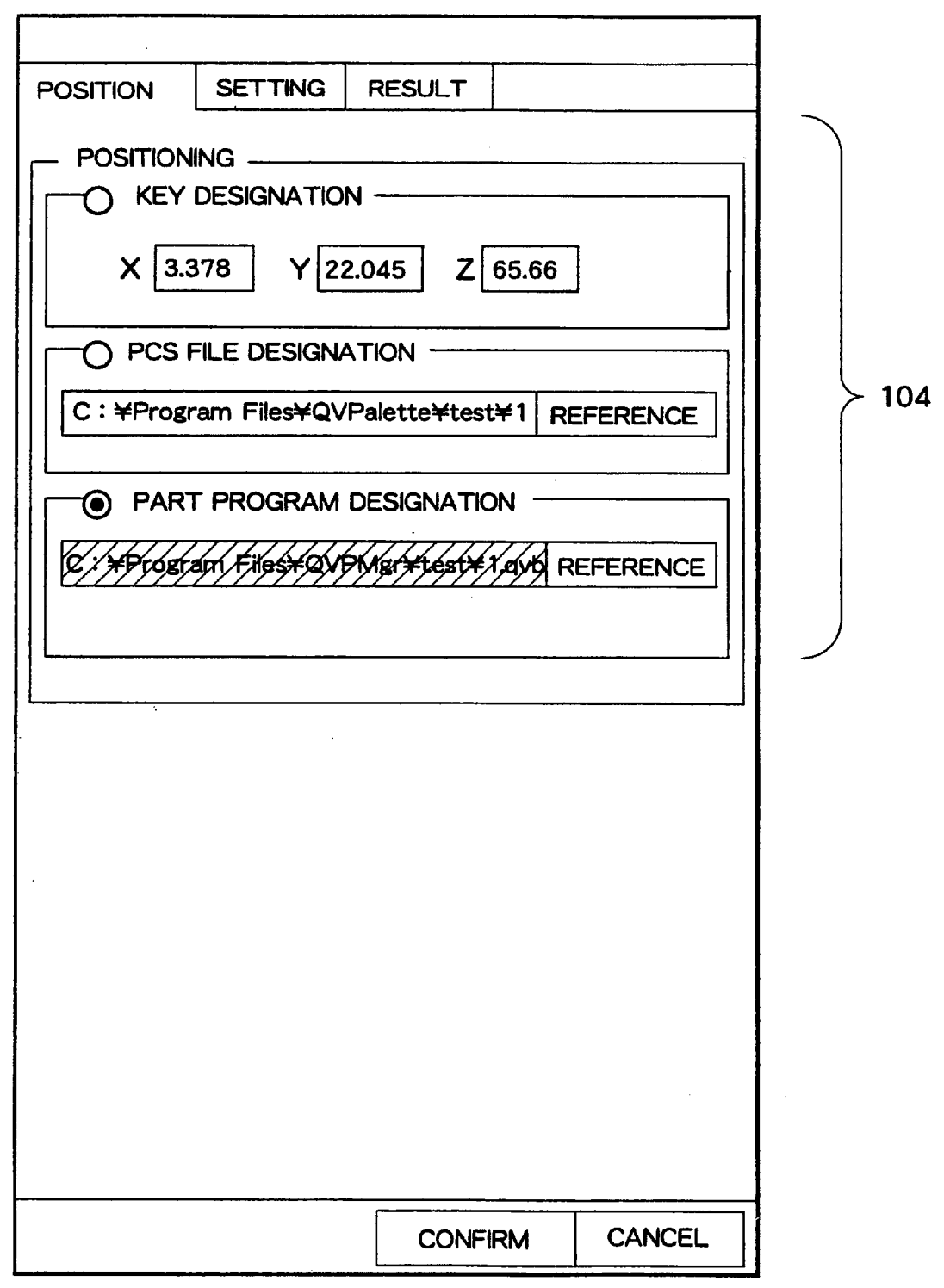

FIG. 8 shows an image screen for setting a reference coordinate system by inputting a necessary parameter (S101 in FIG. 3). Here, "a reference coordinate system" means the coordinate system of a palette bearing a plurality of workpieces 12, not the (X, Y, Z) coordinate system of the stage, and is expressed by means of a reference position of the palette (e.g., the position of one of the four corners of a rectangular palette) relative to the reference position (e.g., the origin) of the (X, Y, Z) coordinate system. A palette reference position can be designated either by inputting X-axis, Y-axis, and Z-axis coordinate values (key designation), by selecting a coordinate system matching program for automatically detecting a reference position (PCS program), or by designating a particular part program. A menu for the above items is shown in the position matching window section 104, so that an operator selects a desired alternative to thereby designate a reference coordinate system, or a reference position of the palette.

With a coordinate system once set, the numbers of rows and columns of workpieces arranged in matrix on the palette are set (S102). Specifically, "setting" tab is selected from among "position", "setting", and "result" tabs, shown in the upper part of FIG. 8. When the "setting" tab has been selected, a setting screen, as shown in FIG. 9, is shown on the CRT 34.

Referring to FIG. 9, a row and column label setting window section 105 are displayed. By inputting suitable numbers into the respective windows in the section 105, the numbers of rows and columns of workpieces to be measured are designated. In the drawing, "seven" rows and "seven" columns are set because forty-nine (vertically seven x horizontally seven) workpieces are present on the palette segmented in a matrix.

After the number of rows and columns are set, the number of measurement executions is set (S103). Although measurement is usually executed only once, this parameter setting is included in consideration of a case wherein measurement must be repeated two or more times. The number of executions can be designated by inputting a desired number into a suitable window in the row and column label setting window section 105. In the drawing, "once" is selected.

Once the number of executions has been set, a measurement part program is set (S104) by selecting a predetermined part program file, using a part program window section 106, shown in FIG. 9. As described above, a part program is composed by storing information of a measurement procedure for one sample, taught by an operator, as well as information on a workpiece position, shape, and so on, and comprises the steps of performing image processing with respect to a workpiece image to extract an edge for temporal storage, and of reading the extracted edge to perform a performing predetermined operation (measurement of a line width, circular center coordinates, a circular radius, and roundness). For image processing, a measurement tool is provided to a part of a workpiece image for measurement. A part program file can be pre-stored in the program memory 39, so that a desired part program can be later designated, using the part program window section 106, by selecting a desired program from a plurality of part programs stored in the memory 39. Note that, in this embodiment, up to two part programs can be set, as shown in FIG. 9, in consideration of a case where workpieces are placed displaced from one another, and thus a PCS part program for reference position matching for each workpiece, and a measurement part program for measurement after the reference position matching, must both be set.

Once a part program has been set, a start position is set (S105). A start position is the position at which measurement is to start, and is designated using the position of a workpiece to be initially measured as a reference. Referring to FIG. 9, a start position can be designated by inputting appropriate X, Y, Z coordinate values, using a start position setting window section 107.

Once a start position has been set, a measurement data file is set (S106). The measurement data file is a file which stores measurement data of a plurality of workpieces, and can be designated by inputting a desired file name using measurement data file window section 108 in FIG. 9. Here, it should be noted that, as each measurement data is stored individually in each measurement data file in this embodiment, differing from a conventional art, in which measurement data of a plurality of workpieces are stored together in a single measurement data file, in actuality, measurement data file, of which name is designated here, will serve as a parent file of a plurality of measurement data sub-files prepared each for each workpiece. In other words, measurement data is actually stored in a subordinate file of the file set here. A subordinate file is automatically made. Specifically, in response to designation "R990601_01.txt" as a name of measurement data file, files "R9906010A01.txt", "R9906010A02.txt", "R9906010A03.txt", and so ilk on, will be made each for each workpiece measured, as shown in FIG. 9. These sub-files, which may be set by an operator for each workpiece, may be made, as default, automatically and successively. Further, a statistic result file may also be designated, if necessary, by inputting a desired file name in a statistic result file setting window 109.

After the measurement data file has been set, a start position displacement is set (S107). A start position displacement defines a pitch by which the stage is to move in measuring a plurality of workpieces, and can be designated by inputting "a horizontal displacement" and "a vertical displacement" using a start position designations window section 107.

After the start position displacement has been set, a movement order is set (S108). A movement order is an order at which a plurality of workpieces arranged in matrix are to be measured, and is designated by selecting either "row" or "column" in the movement order setting window 110. When "row" is selected, the plurality of workpieces arranged in matrix are measured sequentially in a lateral direction. When "column" is selected, these workpieces are measured in a vertical direction. Any movement order other than "row" or "column" can also be designated. For example, each workpiece or cell in the matrix may be numbered, and the numbers can be arranged in a desired sequence to thereby designate a movement order.

Having followed the above setting processes, parameters are set to each of the plurality of workpieces. Subsequently, whether or not it is necessary to set a parameter for every row, column, or workpiece, is determined, as shown in FIG. 4 (S109). When all workpieces are of identical type, such parameter setting is unnecessary. When workpieces are of different types in every column, row, or workpiece, parameters must be set for every column, row, or workpiece. Then, relevant parameter input image screens are shown.

FIG. 10 shows an example of an image screen shown on the CRT 34 according to a matrix program upon completion of all processes up to S108. When the number of rows and columns has been set, a matrix 111 having the set number of cells is displayed, together with column labels 112 and row labels 113 around the matrix 111. Column labels are alphabet, such as A, B, C . . . , while row labels are numerals such as 1, 2, 3 . . . . Other types of denotation may be used for the notation. Respective cells in the matrix 111 are sequentially numbered, for example, "1" for the cell in column A and row 1, and "2" for that in column E and row 1. Each cell in the matrix corresponds to a workpiece to be measured on the palette. Therefore, specification of a desired cell enables unique designation of a corresponding workpiece. Parameter for every row, column, and workpiece can be designated by selecting a desired number or notation in the matrix 111, the column labels 111, or the row labels 113.

Specifically, for setting for every workpiece, a cell corresponding to the workpiece of interest is selected. Once a cell has been selected, the CPU 38 controls the CRT 34 to display a measurement parameter input image screen associated with that particular cell according to the matrix program. The image screen is substantially as shown in FIG. 9, in that it includes an execution number setting window, a part program setting window, a start position setting window, and measurement data file setting window, and allows parameter designation by input of a desired value or file name into a suitable window (S110–S115). For setting for every row or column, the number corresponding to the row or column of interest is selected from respective row labels 112 or the column labels 113. Then, the CPU 38 controls the CRT 34 to display an associated measurement parameter input image screen according to the matrix program so that the number of executions and a part program can be set (S110–S115).

Meanwhile, when parameter setting for every row, column, or workpiece is unnecessary, the parameters set at S101 to S108 are copied for all cells in the matrix, whereby identical part programs are set to all of the plurality of workpieces of an identical type, so that identical measurements are performed on each of them. It should be noted that measurement data for the workpieces are stored each in each sub-file, instead of together in a single file, as described above.

Figure 11:
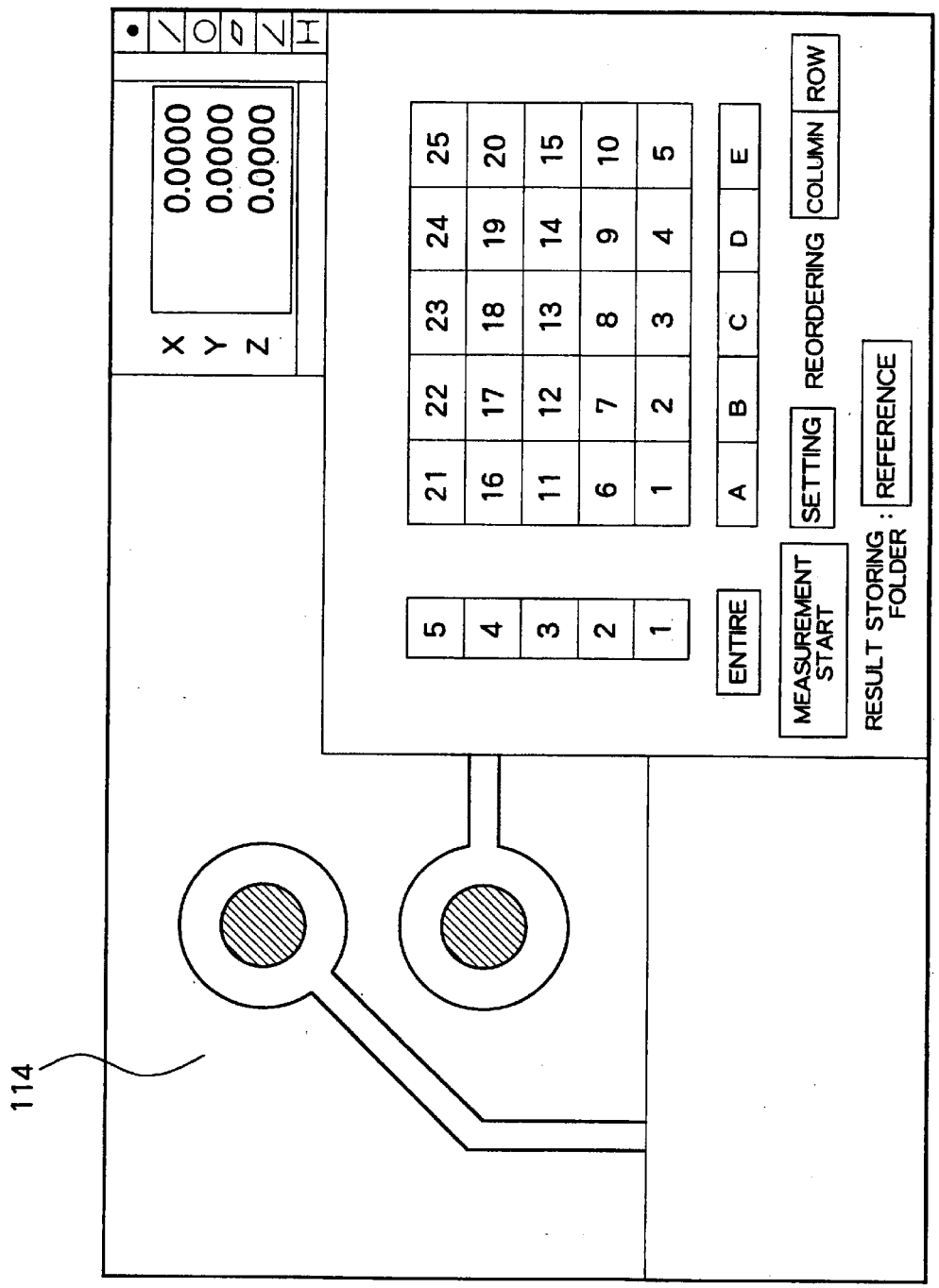
FIG. 11 is a diagram explaining an image screen display in the embodiment.

As described above, a part program can readily be set for every cell or workpiece by executing a matrix program. Note that each image screen of a matrix program can be displayed overlapping an image screen of an image measuring program. FIG. 11 shows an example of an image screen in which an image screen of a matrix program is shown overlapping an image screen 114 of an image measuring program. Here, in an image measuring program, a workpiece image is shown on a CRT 34, and a measurement tool is provided to the image to extract an edge therefrom, using the tool. As respective setting image screens of a matrix program are shown overlapping an image screen of an image measuring program, as described above, parameters can be set while viewing a workpiece image.

Figure 5:
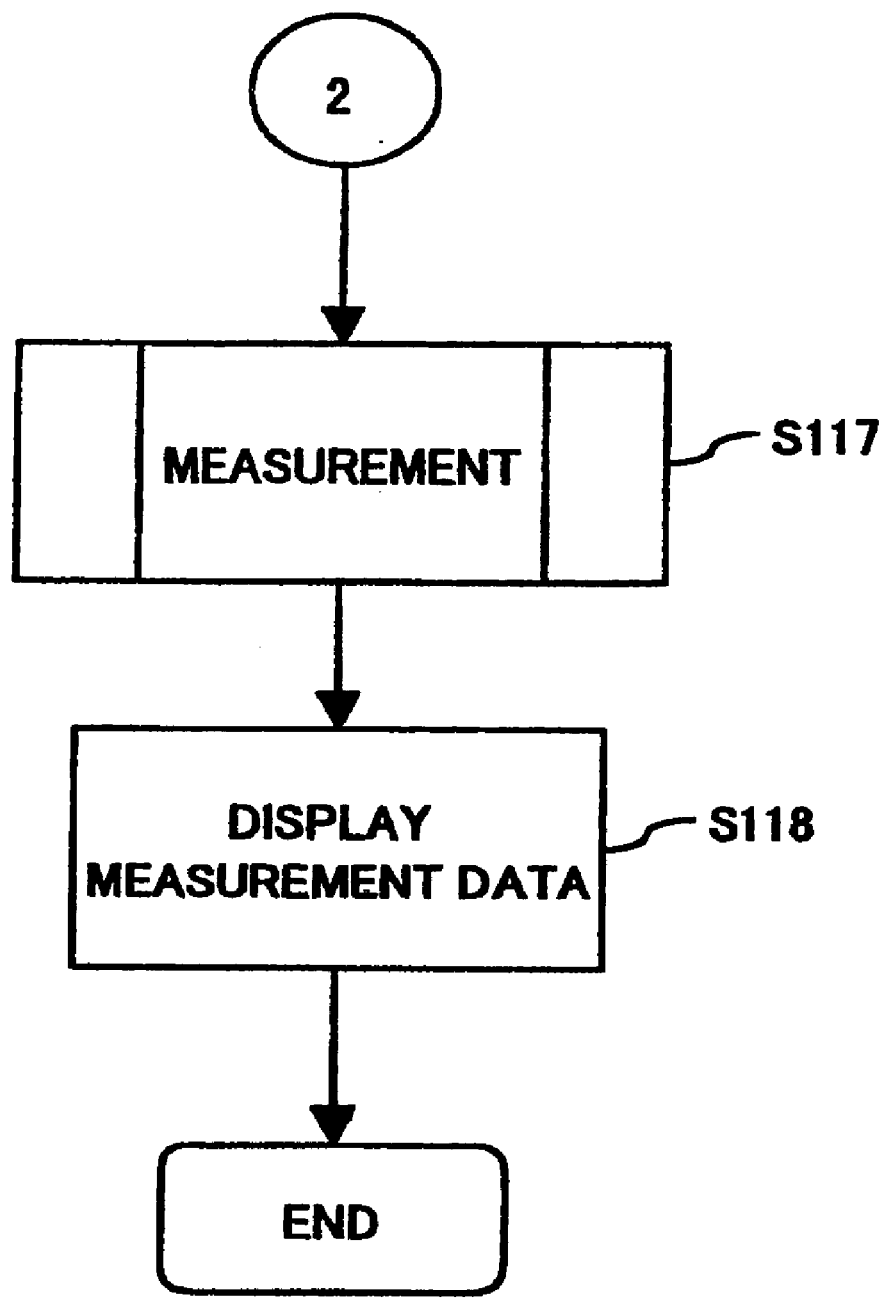

When all parameters have been set, a "measurement start" button, shown in the matrix program screen in FIG. 11, is pressed to thereby start measurement (S117 in FIG. 5). When the measurement completes, measurement data is displayed (S118).

Figure 6:
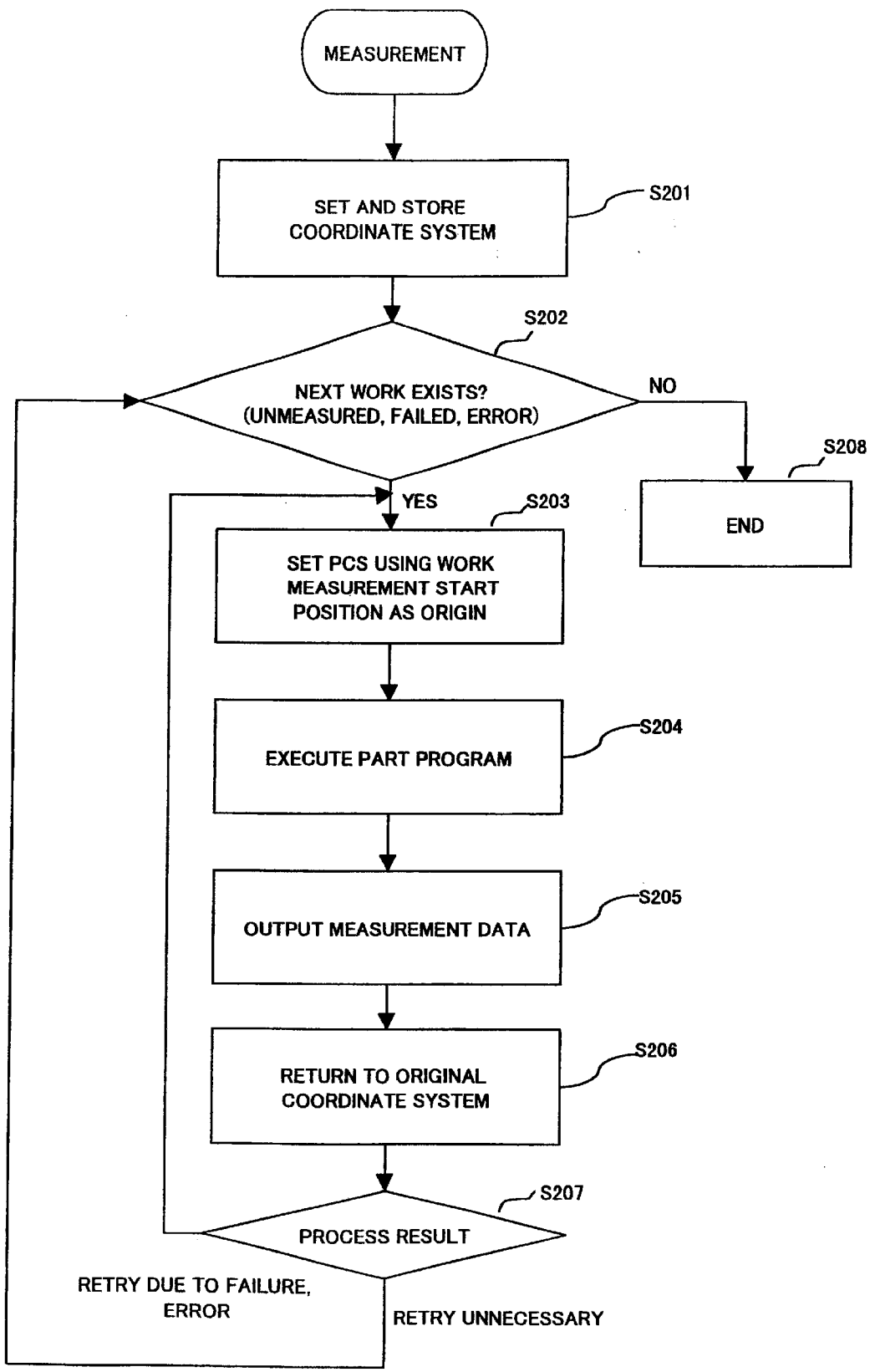
FIG. 6 is a detailed flowchart of measurement in the embodiment.

FIG. 6 shows a flowchart describing in detail the process at S117, or measurement. This process is carried out with the cooperation of an image measuring program and a matrix program. Specifically, the matrix program supplies a measurement part program and information in response to a measurement order, while the image measuring program executes the supplied program, and returns the result to the matrix program.

Referring to FIG. 6, for measurement, a coordinate system is initially set, and stored (S201). This process is identical to that at S101. The set parameters are supplied from the matrix program to the image measuring program. Then, whether or not a workpiece for measurement exist is determined (S202). When measurement of all workpieces is yet to be finished, PCS setting is carried out using the measurement start position of the remaining workpiece for measurement as an origin (S203). This setting is achieved based on a PCS file designated using a part program setting window for every workpiece, for matching a measurement reference position with the actual position of each workpiece. Of note is the fact that two part programs (a PCS part program and a measurement part program) can be set in this embodiment. After the PCS setting, i.e., after reference position matching, a measurement part program is executed (S204). This part program is executed based on a measurement part program having been set using a part program setting window for every workpiece. During execution of a measurement part program, an edge is extracted from a workpiece image, using a measurement tool, and a line width, circle center coordinates, a circle radius, and roundness, are measured based on the extracted edge.

After a predetermined operation is completed with respect to a cell or workpiece through execution of a part program, measurement data of that cell or workpiece is output (S205). Measurement data can be output as a value indicative of a line width or a circle radius, or as a comparison result between the measurement data and a predetermined tolerance. A tolerance comparison result may preferably be expressed as "pass" for within tolerance, "fail" for out of tolerance, and "error" for incapable measurement due to incapable edge extraction. Then, after the measurement coordinate system is reset to the original (S206), what process should next be applied is determined based on the measurement data (S207). That is, in this embodiment, as measurement of a plurality of workpieces is carried out through matrix processing, should any measurement disorder, i.e., error or failure, be caused during measurement with a certain workpiece, the measurement, in principle, continues until all cells in the matrix will have been measured, rather than being halted then. However, an operator may rather wish to remeasure the workpiece (or cell) for which the error was generated. In order to cope with such a demand, the process to be applied upon error or failure can be set as desired in this embodiment. This process can be set before the start of measurement according to a matrix program, by the CPU 38 controlling the CRT 34 to display an image screen for setting a process to apply upon error or failure, and then by an operator inputting a desired parameter. A process to apply upon error or failure may preferably include "retry" in addition to default "skip to the next". "Halt part program" may also be an alternative. With "skip to the next" selected, the image measuring programs are shifted to continue measurement of the next workpiece according to a command from the matrix program even though an error or failure could occur, rather than halting there (S207 to S202). With "retry" selected, the PCS part program and the measurement part program are executed again with respect to the errored or failed workpiece for measurement (S207 to S203). This is repeated until all workpieces or cells have been measured (S202 and S209).

FIG. 12 shows an example of an image screen showing measurement data, which are output at S205, in which measurement data is shown for each cell as "pass" 124, "error" 126, or "fail" 128. As for a workpiece or a cell still being measured, "being measured" is indicated. What proportion to the entire workpieces or cells in the matrix has been measured thus far can be ascertained at a glance at the image screen. A passing rate 132 and a time to complete measurement 134 are also indicated. A passing rate is a ratio of the number of passed workpieces relative to the number of workpieces having been measured thus far. A time to complete measurement is calculated based on a time required to complete measurement of one workpiece and the number of workpieces for measurement. Such information is calculated and output in addition to measurement data, which are output at S205.

FIG. 13 shows an example of an image screen which is shown upon completion of measurement with respect to all workpieces or cells. In the drawing, measurement data are shown for all cells in the matrix 11, as is an overall passing rate for the cells. In order to confirm the result in a file format, measurement data file storing the measurement data should be referred to.

FIG. 14 shows an example of an image screen which is shown upon access to measurement data file. In a comprehensive information display window section 130, the workpieces measured (i.e.,the number of rows x the number of columns),passed workpieces, failed workpieces, and errors are indicated, while, in a result file window section 132, file names and measurement data corresponding to the respective workpieces or cells are shown. For example, as to cell No. 1, a file named "R990601_010A01.txt" and measurement data "pass" are shown. Details of measurement data for each workpiece or cell can be confirmed by referring to an associated file.

FIG. 15 shows an example of an image screen shown upon access to measurement data file for each workpiece or cell, in which an element, actual measurement value, design value, error, upper tolerance limit, and lower tolerance limit for a workpiece are shown in value, as well as in OK/NG discrimination.

As described above, in this embodiment, a stage or a palette is segmented in matrix so that a part program can be set for each cell in the matrix, and measurement data of each cell is stored in an individual file so that it can be output individually. With this arrangement, even when workpieces of a plurality of different types coexist, they can be easily measured to obtain results. Also, as measurement data of a plurality of workpieces are output for every cell, statistical or other processing, if subsequently applied, can be easily performed using the measurement data of a number of desired cells. In addition, as the whole matrix is collectively processed as one processing unit, should an error be caused during measurement, the remaining workpieces can nevertheless be measured. This enables efficient measurement.

Note that the processing in FIGS. 3 to 6 is carried out by the CPU 8 sequentially executing the image measuring program and the matrix program. These programs can be stored in a computer readable medium, such as CD-ROM, DVD-ROM, and a hard disk, which can electromagnetically, chemically, and optically hold information. In FIG. 1, these programs are stored in a CD-ROM 200 to be installed therefrom to the vision measuring machine.

Further, each cell in a matrix may be set with a desired shape other than the rectangular shape shown in this embodiment, or, alternatively, may be defined using a closed, curving line according to the shape of a workpiece to be measured.

In addition, although all 7×7 workpieces are measured in the example of this embodiment, workpieces may be selected, e.g., at random, for measurement. For random selection, random numbers may be generated, and cells with identical numbers thereto measured. Alternatively, cells for measurement may be manually selected by an operator. Based on the measurement data of randomly selected workpieces, an error ratio for the entire cells can be statistically estimated.

Further, although measurement is generally carried out by imaging one measurement section, and executing an associated measuring program, images of a plurality of measurement sections may be captured simultaneously, depending on the size of a designated measurement section and a magnification factor of a CCD camera (see FIG. 11, two circular measurement sections including the upper circle and the lower circle). In this case, measurement programs set for the plurality of measurement sections are simultaneously or sequentially executed for measurement. This arrangement can eliminate the need of positioning a measurement section for every measurement, and thereby facilitate high speed measurement.

Instead of setting a measurement program for each measurement section, a measurement program element may be set in advance. The shape of a measurement object image is recognized when photographing the measurement section, and a suitable measurement program is selected and executed based on the result of recognition.

With this arrangement, program preparation can be simplified as a whole, improving program preparation efficiency. Also, use of a parametric program, in which a numeric part is replaced by a variable upon necessity, can further improve the efficiency. That is, a parameter (a diameter, or center coordinates of a circle, and so on) of a measuring object is measured from a photographed result, and a measured value of the parameter is stored in the variable before executing the measurement program.

With this arrangement, a measurement program can be prepared without dependency on the size of a measurement object image. That is, one program can be commonly used in measurement of an object imaged at different magnification factors or measurements of workpieces of different sizes. In other words, program sharing can be achieved, resulting in significant improvement in program preparation efficiency.

Further, various error corrections (corrections on expansion/contraction with a workpiece or measurement device due to temperature, on measuring displacement accuracy, on volumetric measuring accuracy, and so on) can be applied for improved measurement accuracy. For example, a measurement value which would be obtained at, e.g., 20° C., can be calculated from the measured temperatures of a measurement workpiece, a measurement device, each encoder (X, Y, and Z axes), and a CCD camera, and each linear thermal expansion coefficient. Further, a vertical error with respect to the X-and Y-axes of a CCD camera photographing section, or a focal point error in the Z-axis direction can be corrected.

Still further, distortion of a photographing system (e.g., a lens) of a CCD camera can be corrected. As three dimensional spatial measurement distortion can be corrected, highly accurate measurement can be achieved.

Further, instead of using a matrix-segmented palette, as in this embodiment, a plurality of workpieces may be arranged in a matrix directly on a stage, though use of such a palette has an advantage that the entire cells can be easily positioned. For a palette, material not affecting image measurement is preferred. For example, a transparent vessel made of acrylic, glass, and so on, may be preferably used.

Still further, a member for positioning a palette on the stage, such as a positioning stopper or corner, may be preferably provided to define the position of the palette relative to the device for more accurate positioning.

In addition, an automatic palette exchanger may also be provided. This enables, e.g., unmanned operation at night. That is, in response to a palette setting completion signal from the automatic palette exchanger, measurement is started to follow the procedure shown in FIG. 6. Upon completion at S208, a measurement completion signal is output to the automatic palette exchanger, which in turn removes the palette bearing measured workpieces from the measuring machine, and instead places another palette with unmeasured workpieces on the stage of the machine before outputting a palette setting completion signal to the measuring machine. Through repetition of this process, measurement can be automatically applied, conserving manpower as well as cost.

When a workpiece is placed directly on the stage without use of a palette, an automatic workpiece exchanger could automatically exchange the workpieces. This enables successive workpiece measurement.

As described above, according to the present invention, a plurality of workpieces can be measured efficiently through simple operation.

The device of the present invention can readily process a plurality of workpieces of either identical or different types.

The device of the present invention can measure all workpieces on a stage automatically even though any measurement disorder should be caused to some workpieces. As a result, measurement can complete in a short time.

The device of the present invention outputs measurement data of a plurality of workpieces individually. As a result, subsequent statistical processing can be more easily applied.

What is claimed is:

1. A vision measuring machine, comprising:
a stage for bearing physically separate measurement objects placed thereon;
an imaging device for imaging the measurement objects placed on the stage; and
a processing device for measuring measurement object images in an image captured by the imaging device;
wherein the processing device divides the stage into a plurality of sections to form a plurality of measurement sections each having a measurement object image, sets a measurement program to each of the plurality of measurement sections, and measures each of the measurement object images in the plurality of measurement sections based on a corresponding measurement program.

2. A machine according to claim 1, wherein the processing device determines whether or not measurement data on each of the plurality of measurement sections is within a predetermined tolerance, and outputs a GO/NG judgement for each of the plurality of measurement sections.

3. A machine according to claim 1, wherein the processing device outputs measurement data on each of the plurality of measurement sections.

4. A machine according to claim 1, wherein the processing device measures, even though a measurement disorder should be caused to any measurement section, all other measurement sections in the plurality of sections.

5. A machine according to claim 1, wherein the processing device measures only a measurement section selected from the plurality of sections.

6. A machine according to claim 1, wherein the plurality of sections each have a desired shape and are arranged in matrix, and the plurality of measurement sections each are a closed cell.

7. A machine according to claim 1, wherein the imaging device simultaneously images a plurality of measurement sections, and the processing device simultaneously or sequentially executes measurement programs set to each of the plurality of measurement sections.

8. A machine according to claim 1, wherein the processing device sets for every shape element a measurement program to be executed, ascertains shape elements of the measurement object images in the plurality of measurement sections, and selects and executes a measurement program appropriate to the ascertained shape.

9. A machine according to claim 1, wherein each measurement program is a program in which a necessary numeric element is replaced by a variable.

10. A machine according to claim 1, wherein the processing device corrects a measurement error.

11. A machine according to claim 1, further comprising: an automatic workpiece exchanger for automatically exchanging measurement objects.

12. A vision measuring machine, comprising:
    an imaging device for imaging a plurality of physically separate measurement objects on a pallet segmented into a plurality of sections, and
    a processing device for measuring measurement object images in an image captured by the imaging device,
    wherein the processing device divides a measurement area into a plurality of sections to form a plurality of measurement sections, sets a measurement program to each of the plurality of measurement sections, and measures each of the measurement object images in the plurality of measurement sections based on a corresponding measurement program.

13. A machine according to claim 12, wherein the processing device determines whether or not measurement data on each of the plurality of measurement sections is within a predetermined tolerance, and outputs a GO/NG judgement for each of the plurality of measurement sections.

14. A machine according to claim 12, wherein the processing device outputs measurement data on each of the plurality of measurement sections.

15. A machine according to claim 12, wherein the processing device measures all measurement sections in the plurality of sections, even when a measurement disorder has occurred in any measurement section.

16. A machine according to claim 12, wherein the processing device measures only a selected measurement section from among the plurality of sections.

17. A machine according to claim 12, wherein the plurality of sections each have a desired shape and are arranged in matrix, and the measurement sections each are a closed cell.

18. A machine according to claim 12, wherein the imaging device simultaneously images the plurality of measurement sections, and the processing device simultaneously or sequentially executes measurement programs set to each of the plurality of measurement sections.

19. A machine according to claim 12, wherein the processing device sets for every shape element a measurement program to be executed, ascertains shape elements of the measurement object images in the plurality of measurement sections, and selects and executes a measurement program appropriate to the ascertained shape.

20. A machine according to claim 12, wherein each measurement program is a program in which a necessary numeric element is replaced by a variable.

21. A machine according to claim 12, wherein the processing device corrects a measurement error.

22. A machine according to claim 12, further comprising:
    a positioning device for positioning the palette relative to the vision measuring machine.

23. A machine according to claim 12, further comprising:
    an automatic palette exchanger for automatically exchanging palettes.

24. A vision measuring method, comprising the steps of:
    (a) capturing images of a plurality of physically separate measurement objects placed on a stage;
    (b) correlating each of a plurality of measurement sections in a plurality of sections to each of a plurality of measurement object images;
    (c) setting a measurement program to each of the plurality of measurement sections; and
    (d) measuring each of the plurality of measurement object images according to a corresponding measurement program.

25. A method according to claim 24, further comprising the step of displaying data indicating whether or not a result of measurement of each of the plurality of measurement sections is within a predetermined tolerance.

26. A method according to claim 24, further comprising the step of displaying a result of measurement of each of the plurality of measurement sections.

27. A method according to claim 24, wherein all measurement sections are measured at step (d), even when a measurement disorder has occurred to a measurement section.

28. A method according to claim 24, further comprising the step of selecting a measurement section to be measured in the plurality of sections, wherein only the measurement section selected from among the plurality of sections is measured at the step (d).

29. A method according to claim 24, wherein the plurality of sections each have a desired shape and are arranged in matrix, and the plurality of measurement sections each are a closed cell.

30. A method according to claim 24, wherein the plurality of measurement objects are imaged simultaneously, and measurement programs set to each of the plurality of measurement sections are executed simultaneously or sequentially.

31. A method according to claim 24, further comprising the steps of
    (e) setting for every shape element a measurement program to be executed,
    (f) ascertaining shape elements of the measurement object images in the plurality of measurement sections, and
    (g) selecting and executing a measurement program according to the shape ascertained.

32. A method according to claim 24, wherein each measurement program is a program in which a necessary numeric element is replaced by a variable.

33. A method according to claim 24, further comprising a step of correcting a measurement error in measurement object images.

34. A method according to claim 24, further comprising a step of automatically exchanging measurement objects.

35. A vision measuring method, comprising the steps of:
(a) imaging a plurality of physically separate measurement objects on a pallet segmented into a plurality of sections;
(b) dividing a measurement area into a plurality of sections to form a plurality of measurement sections each being correlated to each of a plurality of measurement object images;
(c) setting a measurement program to each of the plurality of measurement sections; and
(d) measuring each of the measurement object images in the plurality of measurement sections based on a corresponding measurement program.

36. A method according to claim 35, further comprising the step of displaying data indicating whether or not a result of measurement of each of the plurality of measurement sections is within a predetermined tolerance.

37. A method according to claim 35, further comprising the step of displaying a result of measurement for each of the plurality of measurement sections.

38. A method according to claim 35, wherein all measurement sections are measured at step (d), even when a measurement disorder has occurred to a measurement section.

39. A method according to claim 35, further comprising the step of selecting a measurement section to be measured in the plurality of sections, wherein only the measurement section selected from among plurality of sections is measured at the step (d).

40. A method according to claim 35, wherein the plurality of sections each have a desired shape and are arranged in matrix, and each of the plurality of measurement sections is a closed cell.

41. A method according to claim 35, wherein the plurality of measurement objects are imaged simultaneously, and measurement programs set to each of the plurality of measurement sections are executed simultaneously or sequentially.

42. A method according to claim 35, further comprising the steps of
(e) setting for every shape element a measurement program to be executed,
(f) ascertaining shape elements of the measurement object images in the plurality of measurement sections, and
(g) selecting and executing a measurement program according to the shape ascertained.

43. A method according to claim 35, wherein each measurement program is a program in which a necessary numeric element is replaced by a variable.

44. A method according to claim 35, further comprising a step of correcting a measurement error in measurement object images.

45. A method according to claim 35, further comprising a step of automatically exchanging measurement objects.

46. A computer readable medium on which is stored an image processing program which, when executed, causes a computer to executes at least the following steps of:
(a) correlating each of a plurality of measurement sections in a plurality of sections to each of a plurality of physically separate measurement objects;
(b) setting a measurement condition to each of the plurality of measurement sections;
(c) measuring for each of the plurality of measurement sections according to a corresponding measurement condition; and
(d) displaying a result of measurement for each of the plurality of measurement sections.

47. A medium according to claim 46, wherein a measurement object is at least one of an IC, a read frame, and an IC package.

* * * * *